(12) United States Patent
Bowditch

(10) Patent No.: US 12,352,200 B2
(45) Date of Patent: Jul. 8, 2025

(54) PISTON FOR COMPRESSION-IGNITION ENGINE HAVING ANTEBOWL AND ENGINE OPERATING STRATEGY UTILIZING SAME

(71) Applicant: Caterpillar Inc., Deerfield, IL (US)

(72) Inventor: Brandon Bowditch, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 621 days.

(21) Appl. No.: 16/199,800

(22) Filed: Nov. 26, 2018

(65) Prior Publication Data

US 2020/0165963 A1    May 28, 2020

(51) Int. Cl.
  *F02B 23/06*    (2006.01)
  *F02D 21/08*    (2006.01)
  *F02F 3/28*     (2006.01)

(52) U.S. Cl.
  CPC ...... *F02B 23/0672* (2013.01); *F02B 23/0624* (2013.01); *F02B 23/0651* (2013.01); *F02B 23/0669* (2013.01); *F02D 21/08* (2013.01); *F02F 3/28* (2013.01); *F02B 2275/14* (2013.01)

(58) Field of Classification Search
  CPC ............. F02B 23/0672; F02B 23/0624; F02B 23/0651; F02B 23/0696; F02B 23/0684; F02B 23/0687; F02F 3/26; F02F 3/28; F02D 21/08
  USPC ........................................................ 123/276
  See application file for complete search history.

(56) References Cited

U.S. PATENT DOCUMENTS

| | | | | |
|---|---|---|---|---|
| 1,679,831 A | * | 8/1928 | Lang | F02B 23/0633 123/282 |
| 1,803,250 A | * | 4/1931 | Hemmingsen | F02B 23/0651 123/276 |
| 1,865,841 A | * | 7/1932 | Cummins | F02B 23/0696 123/26 |
| 4,676,210 A | * | 6/1987 | Moser | F02B 23/0696 123/301 |
| 4,721,080 A | * | 1/1988 | Moriyasu | F02B 23/0636 123/279 |
| 4,966,103 A | * | 10/1990 | Schaub | F02B 7/06 123/276 |

(Continued)

FOREIGN PATENT DOCUMENTS

| | | | | |
|---|---|---|---|---|
| DE | 102009025404 A1 | * | 1/2011 | ......... F02B 23/0651 |
| DE | 102014002625 A1 | | 8/2015 | |

(Continued)

*Primary Examiner* — Logan M Kraft
*Assistant Examiner* — Joshua Campbell
(74) *Attorney, Agent, or Firm* — Brannon Sowers & Cracraft PC

(57) ABSTRACT

A direct-injected compression ignition internal combustion engine includes an engine housing having a cylinder and a piston movable within the cylinder and including a piston end face forming a combustion bowl. The piston end face has an annular piston rim with a rounded inner rim surface that extends radially inward and axially downward from a planar outer rim surface to a combustion bowl edge. An antebowl is defined by the rounded inner rim surface and has an antebowl volume that is about 0.8% or greater of a total volume of the combustion bowl and the antebowl together. A configuration and dimensional attributes of the antebowl is associated with reduced smoke production during operation, particularly for low to mid-load transients.

16 Claims, 4 Drawing Sheets

(56) References Cited

U.S. PATENT DOCUMENTS

| | | | | |
|---|---|---|---|---|
| 5,868,112 A * | 2/1999 | Mahakul | F02B 23/0696 | 123/263 |
| 6,314,933 B1 * | 11/2001 | Iijima | F02B 23/0696 | 123/193.6 |
| 6,997,158 B1 * | 2/2006 | Liu | F02B 23/0672 | 123/307 |
| 7,096,848 B2 * | 8/2006 | Ono | F02F 3/26 | 123/294 |
| 8,770,168 B2 * | 7/2014 | Cornwell | F02B 23/0693 | 123/307 |
| 8,978,621 B2 * | 3/2015 | Easley | F02B 23/0672 | 123/294 |
| 9,234,451 B2 * | 1/2016 | Karch | F02B 23/0693 | |
| 9,328,693 B2 * | 5/2016 | Pierpont | F02F 3/0076 | |
| 2003/0159675 A1 * | 8/2003 | Huebler | F02F 3/26 | 123/306 |
| 2004/0123832 A1 * | 7/2004 | Quigley | F02B 23/0672 | 123/276 |
| 2005/0115537 A1 * | 6/2005 | Liu | F02F 3/26 | 123/276 |
| 2005/0115538 A1 * | 6/2005 | Ono | F02B 23/0693 | 123/299 |
| 2005/0155578 A1 * | 7/2005 | Ichise | F02D 41/401 | 123/431 |
| 2006/0070603 A1 * | 4/2006 | Stanton | F02B 23/0651 | 123/301 |
| 2009/0217905 A1 * | 9/2009 | Tanaka | F02D 13/0249 | 123/276 |
| 2011/0023819 A1 * | 2/2011 | Ives | F02B 23/0669 | 123/145 A |
| 2011/0253096 A1 * | 10/2011 | Easley | F02B 23/0624 | 123/294 |
| 2013/0036998 A1 * | 2/2013 | Cornwell | F02B 23/0669 | 123/193.6 |
| 2013/0047950 A1 * | 2/2013 | Eismark | F02B 23/0627 | 123/193.6 |
| 2013/0239925 A1 * | 9/2013 | Karch | F02D 21/08 | 123/294 |
| 2014/0331961 A1 * | 11/2014 | Ness | F02B 23/0624 | 123/294 |
| 2015/0020765 A1 * | 1/2015 | Pierpont | F02F 3/28 | 123/27 R |
| 2015/0020767 A1 * | 1/2015 | Pierpont | F02B 23/0672 | 123/294 |
| 2015/0198070 A1 * | 7/2015 | Record | F01N 3/10 | 60/299 |
| 2015/0354439 A1 * | 12/2015 | Shimo | F02F 1/24 | 123/659 |
| 2016/0053713 A1 * | 2/2016 | Winsor | F02F 3/26 | 123/193.6 |
| 2017/0030262 A1 * | 2/2017 | Venugopal | F02M 61/14 | |
| 2017/0159549 A1 * | 6/2017 | Uehara | F02F 3/28 | |
| 2018/0058371 A1 * | 3/2018 | Zhang | F02F 3/28 | |
| 2018/0340491 A1 * | 11/2018 | Lee | F02F 3/28 | |
| 2020/0095922 A1 * | 3/2020 | Vassallo | F02F 3/26 | |

FOREIGN PATENT DOCUMENTS

| | | | |
|---|---|---|---|
| FR | 2958977 A1 | | 10/2011 |
| JP | 2011058435 A | * | 3/2011 |
| JP | 2011226435 A | * | 11/2011 |

* cited by examiner

PISTON FOR COMPRESSION-IGNITION ENGINE HAVING ANTEBOWL AND ENGINE OPERATING STRATEGY UTILIZING SAME

TECHNICAL FIELD

The present disclosure relates generally to a piston for a compression ignition internal combustion engine, and more particularly to a piston having a combustion bowl and an antebowl structured for reduced smoke production in response to transient load swings.

BACKGROUND

A great many different operating strategies and component designs are known in the field of internal combustion engines. Research and development has progressed for decades in relation to the manner in which factors such a fueling, exhaust gas recirculation or EGR, turbocharging, variable valve actuation, variable geometry turbines, use of waste gates, and a host of others can be varied to produce different results. In addition to varying these and other operating parameters, a great deal of research and performance testing effort has centered around different ways that engine components, notably pistons in recent years, can be shaped and proportioned to achieve a range of desired outcomes. One motivation driving advancements in combustion science has been the desire to reduce and/or balance relative amounts of certain emissions and engine exhaust, including particulate matter such as soot and oxides of nitrogen or NOx. Improving or optimizing engine performance, increasing fuel efficiency, and managing component wear and/or fatigue remain important goals as well.

In recent years compression ignition diesel engines have been increasingly used for electric power generation, as one or more stand-alone units connected to an isolated local power grid, or provided as a source of backup electric power in the event of regional power grid disruption. Based on jurisdictional requirements, customer demands, or for other reasons, electrical power generation applications can create heightened demands for engine emissions reduction and efficiency as compared to other applications, such as offshore oil and gas uses or marine vessel propulsion. Decades of combustion science, materials, and mechanical engineering research has revealed generally that factors such as emissions and efficiency can be affected significantly and often unpredictably by seemingly minor changes in component design or operating parameters. For this reason, designs and strategies purpose-built for one application may reveal themselves to be less well-suited to others. U.S. Pat. No. 8,978,621 to Easley et al. is directed to a piston having a combustion bowl shaped to balance combustion efficiency and emissions properties. The Easley disclosure proposes a piston having a compound combustion bowl and a compound rim, with an abrupt transition between the compound combustion bowl and the compound rim. The features are stated to together desirably affect emissions such as particulate matter and NOx without unduly sacrificing fuel efficiency.

SUMMARY OF THE INVENTION

In one aspect, a method of operating a compression ignition internal combustion engine includes moving a piston within a cylinder of the internal combustion engine toward a top dead center position, such that a pressure within the cylinder is increased to an autoignition threshold in a first engine cycle. The method further includes injecting spray plumes of a first charge of a liquid fuel into the cylinder in the first engine cycle, such that the spray plumes of the first charge enter a combustion bowl formed in the piston and having a bowl diameter that is about 75% of a cylinder bore diameter of the cylinder or greater. The method further includes combusting the first charge of the liquid fuel at least predominantly within the combustion bowl. The method still further includes moving the piston within the cylinder toward the top dead center position such that a pressure within the cylinder is increased to an autoignition threshold in a second engine cycle, and injecting spray plumes of a second charge of the liquid fuel larger than the first charge into the cylinder in the second engine cycle, such that the spray plumes of the second charge enter the combustion bowl. The method still further includes advancing the spray plumes of the second charge through the cylinder, such that unburned liquid fuel in tails of the spray plumes of the second charge enters an antebowl defined by a rounded inner rim surface of the piston having a radius of curvature from about 40% to about 55% of the bowl diameter and an antebowl volume that is about 0.8% or greater of a total volume of the combustion bowl and the antebowl together, and combusting the second charge of the liquid fuel within the combustion bowl and within the antebowl.

In another aspect, a direct-injected compression ignition internal combustion engine includes an engine housing having a cylinder formed therein with a cylinder bore diameter, a fuel injector including an injector tip positioned within the cylinder, and a piston movable within the cylinder from a bottom dead center position to a top dead center position to increase a pressure of fuel and air within the cylinder to an autoignition threshold. The piston includes a piston body defining a longitudinal axis extending between a first axial piston body end and a second axial piston body end having a piston end face. The piston end face forms a combustion bowl including a convex center section transitioning radially outward from the longitudinal axis and axially downward to a combustion bowl floor, and a concave outer section transitioning radially outward and axially upward from the combustion bowl floor toward a combustion bowl edge defining an edge plane. The piston end face further includes an annular piston rim having a planar outer rim surface that is oriented normal to the longitudinal axis and defines a rim plane, and a rounded inner rim surface that extends radially inward and axially downward from the planar outer rim surface to the combustion bowl edge. An antebowl is defined by the rounded inner rim surface and extends between the rim plane and the edge plane. The combustion bowl has a bowl diameter that is about 75% of the cylinder bore diameter or greater. The rounded inner rim surface has a radius of curvature that is from about 40% to about 55% of the bowl diameter, and the antebowl has an antebowl volume that is about 0.8% or greater of a total volume of the combustion bowl and the antebowl together.

In still another aspect, a piston for a compression ignition internal combustion engine includes a piston body defining a longitudinal piston axis and including a piston crown, the piston crown having an outer piston surface extending circumferentially around the longitudinal axis and having a plurality of piston ring grooves formed therein and a piston end face forming a combustion bowl. The combustion bowl includes a convex center section transitioning radially outward from the longitudinal piston axis and axially downward to a combustion bowl floor, and a concave outer section transitioning radially outward and axially upward from the combustion bowl floor toward a combustion bowl edge defining an edge plane. The piston end face further includes an annular piston rim having a planar outer rim surface that is oriented normal to the longitudinal axis and defines a rim plane, and a rounded inner rim surface that extends radially inward and axially downward from the planar outer rim surface to the combustion bowl edge. An antebowl is defined by the rounded inner rim surface and extends between the rim plane and the edge plane. The combustion bowl defines a bowl diameter from about 120 millimeters to about 135 millimeters, the rounded inner rim surface has a radius of curvature that is from about 50 millimeters to about 70 millimeters, and the antebowl has an antebowl volume that is about 2,000 cubic millimeters.

DETAILED DESCRIPTION

Figure 1:
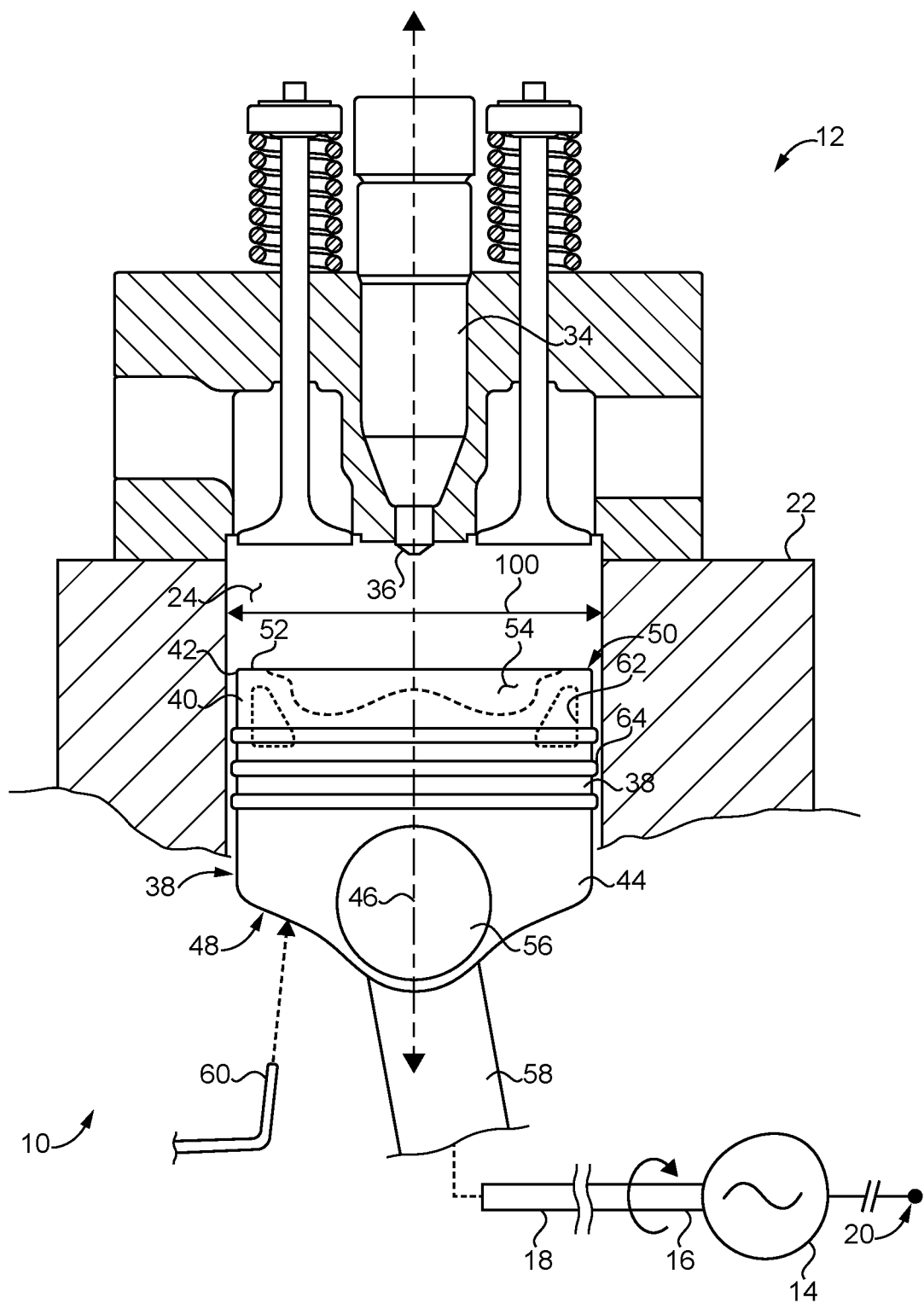
FIG. 1 is a partially sectioned side diagrammatic view of an electrical power system, according to one embodiment.

Referring to FIG. 1, there is shown an electrical power system 10, according to one embodiment, and including a direct-injected compression ignition internal combustion engine 12 coupled with an electrical generator 14 structured to supply electrical power to a power grid 20. Electrical power system 10 could be one of a plurality of engine and generator sets structured, for example, to supply backup electrical power or standard operating electrical power to a server farm, an industrial or mining site, or for a variety of other applications, however, the present disclosure is not thereby limited. Direct-injected compression ignition internal combustion engine 12 (hereinafter "engine 12") may include or be coupled with a driveshaft 18 structured to rotate an input shaft 16 of electrical generator 14. Engine 12 includes an engine housing 22 having a cylinder 24 formed therein. Cylinder 24 may be one of a plurality of substantially identical cylinders in engine 12 arranged in a V-configuration, an in-line configuration, or in any other suitable arrangement. A plurality of gas exchange valves, and in the illustrated embodiment an intake valve 30 and an exhaust valve 32, may be coupled with engine housing 22 to control, respectively, the supply of intake air to cylinder 24, or intake air and recirculated exhaust gas for instance, and exhaust of combustion products in a generally conventional manner. Cylinder 24 includes a cylinder bore diameter 100. Cylinder bore diameter 100 may be from about 160 millimeters to about 180 millimeters, and in a practical implementation strategy is about 170 millimeters. As used herein, the term "about" can be understood in the context of conventional rounding to a consistent number of significant digits. Accordingly, "about 170" means from 165 to 174, "about 165" means from 164.5 to 165.4, and so on. Where the term "about" is not used in connection with an expressed quantity, that quantity can be understood as exact within conventional manufacturing tolerances, performance criteria, or measurement error as the case may be. Those skilled in the art will appreciate that cylinder bore diameter 100 is relatively large. Engine 12 could be implemented in an electrical power generation application rated for outputting approximately 3 megawatts at 60 Hertz, for example, although the present disclosure is not thereby limited. Engine 12 can be compression ignited as noted above, and could operate on diesel distillate fuel, biodiesel, blends of these, or on still another fuel. As will be further apparent from the following description, engine 12 may be uniquely configured such as by way of piston geometry to limit spikes in smoke production that might otherwise be observed in response to low-load or medium-load transients or upon startup.

Engine 12 further includes a fuel injector 34 having an injector tip 36 positioned within cylinder 24, and a piston 38 movable within cylinder 24 from a bottom dead center position to a top dead center position to increase a pressure of fuel and air within cylinder 24 to an autoignition threshold. A compression ratio of engine 12 may be from about 13.75 to about 16.5 in some embodiments. Engine housing 22 further includes an engine head 28 wherein intake valve 30 and exhaust valve 32 are positioned. Also positioned within engine head 28 is fuel injector 36.

Piston 38 includes a piston body 40 defining a longitudinal axis 46 extending between a first axial piston body end 48 and a second axial piston body end 50 having a piston end face 52. Piston body 40 can include a piston crown 42 where upon piston end face 52 is located and attached to a piston skirt 44 such as by inertia welding. Discussions here in of piston 38, piston body 40, and piston crown 42 may all refer to and focus on the same basic features except where otherwise indicated or apparent from the context. A wrist pin 56 is positioned within piston 38 and is coupled with a connecting rod 58 structured to rotate a crankshaft (not shown) in a generally conventional manner, in turn coupled with driveshaft 18. An oil sprayer 60 is shown positioned beneath piston 38 to spray cooling oil toward and into a backside cooling cavity 62. Piston rings 64 are positioned upon piston body 40, again in a generally conventional manner.

Figure 2:
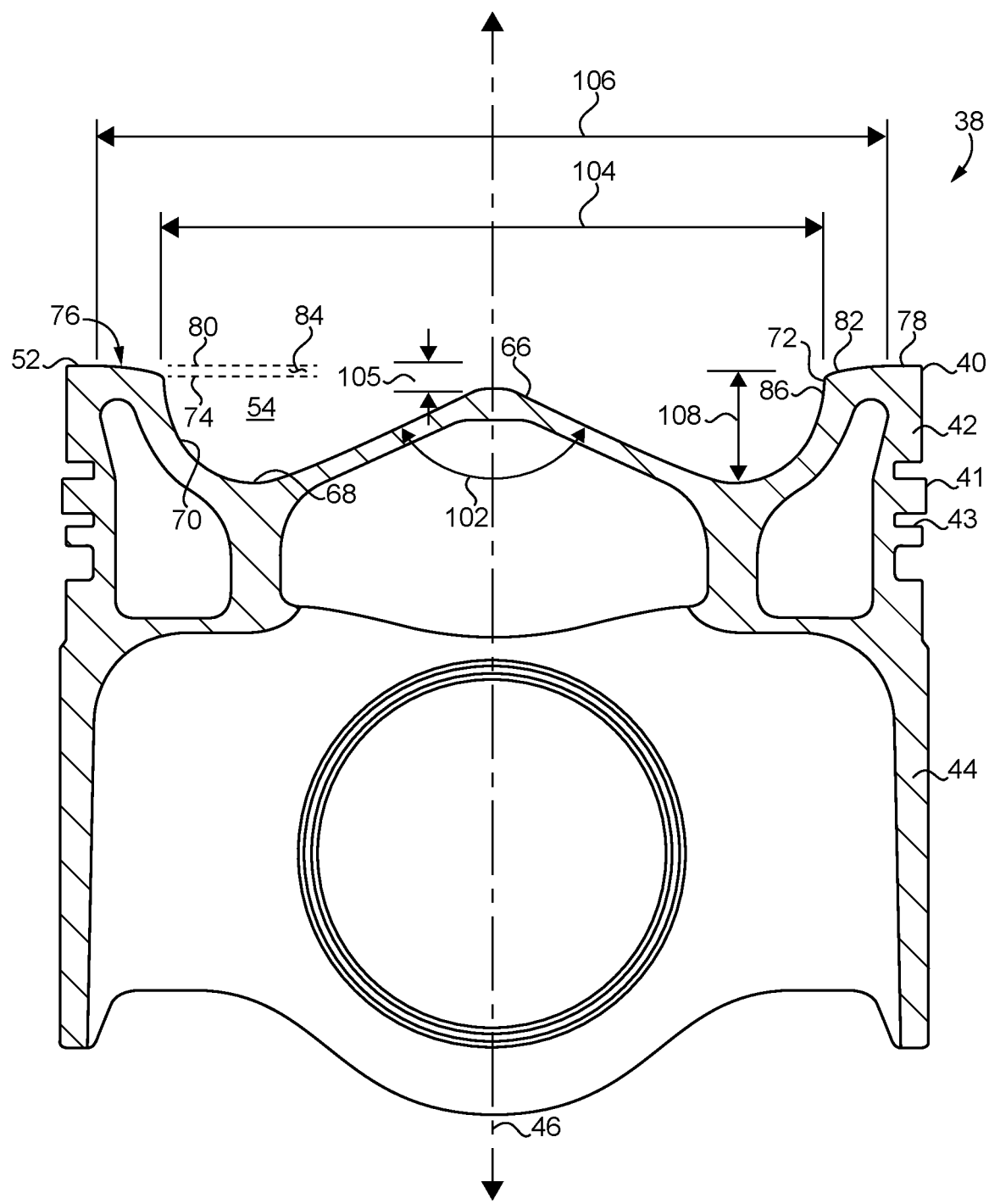
FIG. 2 is a sectioned side diagrammatic view of a piston, according to one embodiment.

Referring also now to FIG. 2, piston body 40, and piston crown 42, further includes an outer surface 41 extending circumferentially around longitudinal axis 46, and a plurality of piston ring grooves 43 formed in outer surface 41. Piston end face 52 forms a combustion bowl 54 having a convex center section 66 generally understood to form a cone having a peak and being centered about longitudinal axis 46. In the illustrated embodiment convex center section 66 defines a cone angle 102 that is about 130°. Convex center section 66 transitions radially outward from longitudinal axis 46 and axially downward to a combustion bowl floor 68. Combustion bowl 54 further includes a concave outer section 70 transitioning radially outward and axially upward from combustion bowl floor 68 toward a combustion bowl edge 72 defining an edge plane 74. Concave outer section 70 may have a single radius of curvature from combustion bowl floor 68 to straight vertical section 86, although embodiments where the radius of curvature of concave outer section 70 varies are nevertheless contemplated herein. Piston end face 52 further includes an annular piston rim 76 having a planar outer rim surface 78 that is oriented normal to longitudinal axis 46 and defines a rim plane 80. Annular piston rim 76 further includes a rounded inner rim surface 82 that extends radially inward and axially downward from planar outer rim surface 78 to combustion bowl edge 72. As used herein the terms "axially upward" and "axially downward" refer to directions along and parallel to longitudinal axis 42 and away from and toward, respectively, combustion bowl floor 68. Piston end face 52 may have a uniform profile of rotation circumferentially around longitudinal axis 46.

Figure 3:
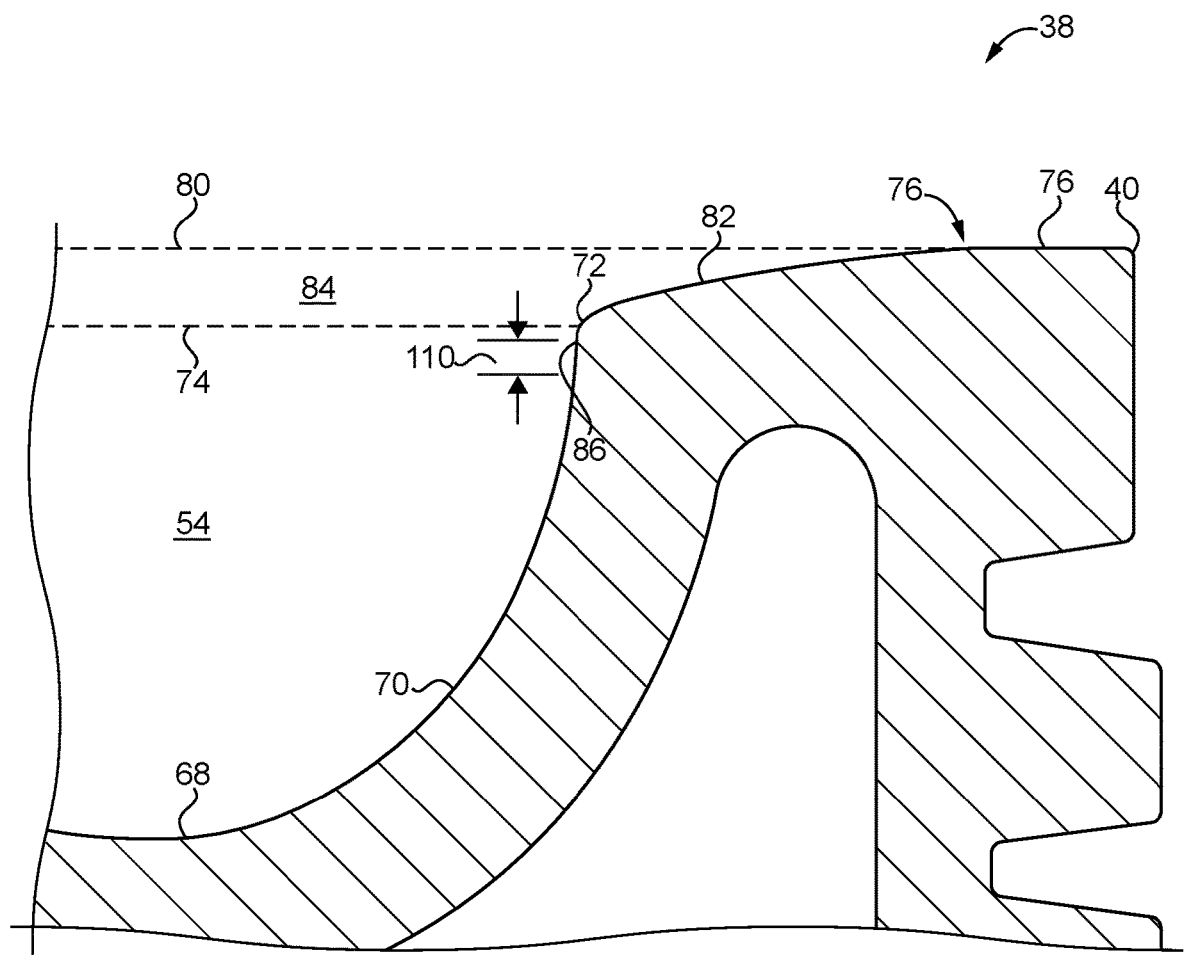
FIG. 3 is an enlarged view of a portion of the piston of FIG. 2.

Referring also now to FIG. 3, piston 38 further includes an antebowl 84 defined by rounded inner rim surface 82 and extending between rim plane 80 and edge plane 74. Combustion bowl 54 also includes a straight vertical section 86 transitioning from concave outer section 70 to combustion bowl edge 72. Straight vertical section 86 adjoins combustion bowl edge 72 and is oriented parallel to longitudinal piston axis 46. Straight vertical section 86 may have a vertical length 110 from about 1 millimeter to about 2 millimeters. Combustion bowl edge 72 may have a radius of curvature from about 1 millimeter to about 2 millimeters. A bowl depth 108 between combustion bowl floor 68 and rim plane 80 may be about 23 millimeters. More particularly still, a radius of curvature of combustion bowl edge 72 may be about 1.3 millimeters, vertical length 108 of straight section 86 may be about 1.5 millimeters. Concave outer section may have a radius of curvature of about 20 millimeters, and more particularly about 19 millimeters. Convex center section 66 may have a cone depth 105 from rim plane 80 that is about 4 millimeters, and more particularly about 4.4 millimeters. A radius of curvature defined by convex center section 66 may be about 16 millimeters.

Combustion bowl 54 further has a bowl diameter 104 that is about 75% of cylinder bore diameter 100 or greater. Rounded inner rim surface 82 has a radius of curvature that is from about 40% to about 55% of bowl diameter 100. In an embodiment where cylinder bore diameter 100 is about 170 millimeters, or potentially in other embodiments, bowl diameter 104 may be about 130 millimeters, more particularly about 131 millimeters, and radius of curvature of rounded inner rim surface 82 may be about 60 millimeters, more particularly about 58.6 millimeters. Embodiments are nevertheless contemplated where these and other dimensional attributes vary in a range. Bowl diameter 104 may be from about 120 millimeters to about 135 millimeters. The radius of curvature of rounded inner rim surface 82 may be from about 50 millimeters to about 70 millimeters.

As noted above, antebowl 84 is defined by rounded inner rim surface 82, and extends between rim plane 80 and edge plane 74. Edge plane 74 may be located at an axial location that intersects a center point of rounded combustion bowl edge 72, whereas rim plane 80 may be located at an axial location of planar outer rim surface 78. Antebowl 84 can be understood as before or adjacent to combustion bowl 54 in the sense of an antechamber and participates in combustion of injected plumes of liquid fuel under at least certain conditions as further discussed herein. Antebowl 84 has an antebowl diameter 106 as shown in FIG. 2, having as endpoints a location of transition from planar outer rim surface 78 to rounded inner rim surface 82, in a section plane that includes longitudinal axis 46, approximately as depicted in the drawings. In an implementation antebowl diameter 106 is about 120% of bowl diameter 104 or greater, with bowl diameter 104 having as endpoints straight vertical section 86 on opposite sides of combustion bowl 54, in a section plane that includes longitudinal axis 46, approximately as depicted in the drawings. Bowl diameter 106 may be about 77% of cylinder bore diameter 100. Antebowl diameter 106 may be about 160 millimeters in a practical implementation. Antebowl 84 may further have an antebowl volume that is about 0.8% or greater of a total volume of combustion bowl 54 and antebowl 84 together. Accordingly, adding together the volumes of combustion bowl 54 and antebowl 84, about 0.8% or greater of the sum of the two volumes may be comprised by a volume of antebowl 84. More particularly, the antebowl volume might be from about 0.8% to about 1% of the sum of the two volumes. The total volume of combustion bowl 54 and antebowl 84 together may be from about $200 \times 10^3$ cubic millimeters to about $260 \times 10^3$ cubic millimeters. In a further implementation the antebowl volume may be about 2,000 cubic millimeters, more particularly about 2,060 cubic millimeters, and the total volume of combustion bowl 54 and antebowl 84 together may be about $244 \times 10^3$ cubic millimeters, with the antebowl volume being about 0.84% of the sum of the two volumes. One particular combination of dimensional attributes can include bowl diameter 104 being from about 120 millimeters to about 135 millimeters, the radius of curvature of rounded inner rim surface 82 being from about 50 millimeters to about 70 millimeters, and the antebowl volume being about 2,000 cubic millimeters. It should also be appreciated that certain combinations at the extremes of the disclosed ranges and proportions might not be physically possible to construct. Those skilled in the art will nevertheless find a plurality of workable combinations of the dimensional and proportional attributes disclosed herein.

INDUSTRIAL APPLICABILITY

Figure 4:
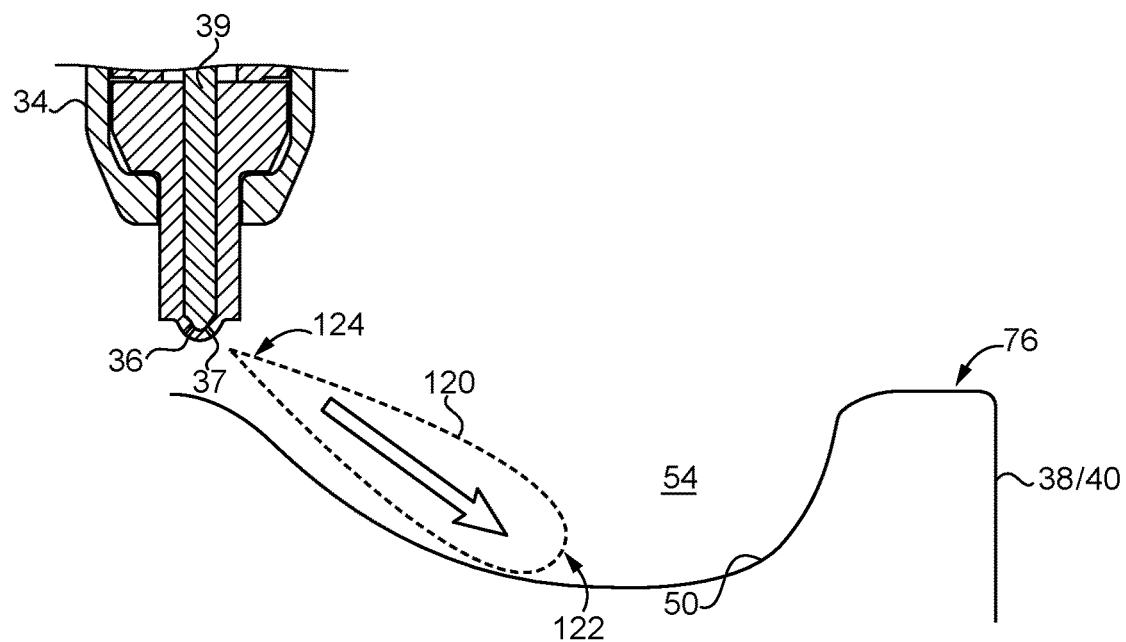
FIG. 4 is a concept diagram of fuel plume injection and advancement in an internal combustion engine, at a first set of conditions.
Figure 4:
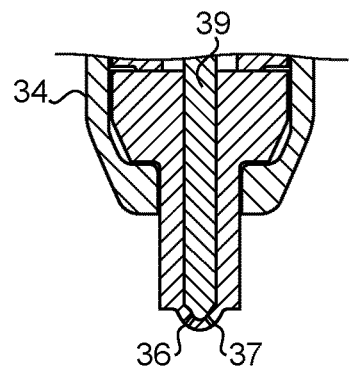
Figure 5:
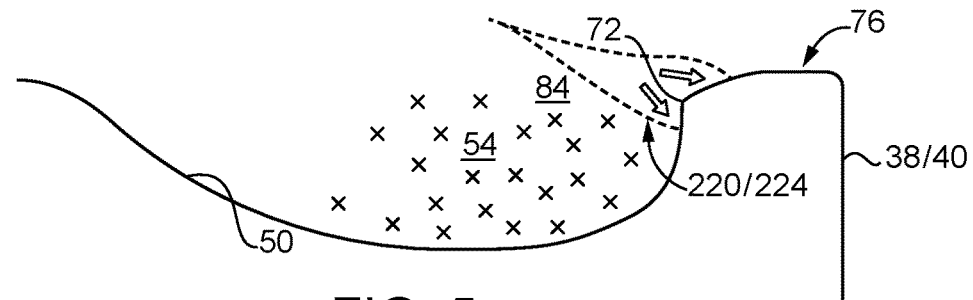
FIG. 5 is a concept diagram of fuel plume injection and advancement in an internal combustion engine at a second set of conditions.

Referring to the drawings generally and also now to FIGS. 4 and 5, operating engine 12 can include moving piston 38 within cylinder 24 of engine 12 toward a top dead center position, such that a pressure within cylinder 24 is increased to an autoignition threshold in a first engine cycle. At a suitable start of injection time, such as about 8° to about 10° before top dead center, an outlet check 39 in fuel injector 34 can be opened to commence injecting spray plumes of a first charge of a liquid fuel from a plurality of spray orifices 36 into cylinder 24 in the first engine cycle. Spray orifices 36 could be from 3 to 8 in number, for example, and arranged at a uniform spray angle relative to longitudinal axis 46 and spaced regularly circumferentially about longitudinal axis 46. The spray angle will typically be a few degrees, such as about 5° to about 10°, larger than cone angle 102. The concept diagram of FIG. 4 illustrates a spray plume 120 having a plume front 122 and a plume tail 124 as it might appear just after an end of an injection, which might occur at about 20° to about 30° after top dead center. The presently described methodology could include operating engine 12 at about 1200 to about 1800 RPM and utilizing a peak injection pressure greater than 125 megapascals (MPa) in one embodiment, and potentially greater than 160 MPa.

The spray plumes of the first charge of injected liquid fuel may advance through cylinder 24 and enter combustion bowl 54, with combustion bowl 54 structured and proportioned as discussed herein. Operating engine 12 can further include combusting the first charge of a liquid fuel at least predominantly within combustion bowl 54. From the state depicted in FIG. 4, spray plume 120 can continue to travel outwardly generally following a profile of piston end face 52. Based on the injection timing piston 38 may reach its top dead center position and begin moving back toward its bottom dead center position while fuel injection is taking place. At relatively lower loads, such as an idle-level engine load or a high-idle-level engine load, there is generally sufficient time to inject an amount of a liquid fuel that is needed to operate engine 12 such that substantially all of the injected liquid fuel combusts within combustion bowl 54. It is believed that combustion of injected fuel at least predominantly, and certainly substantially entirely, within combustion bowl 54 can be associated with relatively low levels of smoke. At relatively high engine loads, above 75% of a rated load level, for example, the relatively high combustion temperatures tend to result also in acceptably low levels of smoke production. Where transient load changes are experienced closer to the middle of an available engine load range, or at startup, managing smoke can be more challenging.

Operating engine 12 can further include moving piston 38 within cylinder 24 toward a top dead center position such that a pressure within cylinder 24 is increased to an autoignition threshold in a second engine cycle occurring later than the first engine cycle. Where engine load is increased from the first engine cycle to the second engine cycle, an amount of the liquid fuel injected from the first engine cycle to the second engine cycle may be increased in response to a transient demand to operate engine 12 at the increased engine load. The increased engine load may be about 50% or less of an available engine load, in this example being the low- to middle-load transient scenario discussed above. Other transient scenarios might include increasing from about 10% load to about 40% load, from about 40% load to about 60% load, or still others. Operating engine 12 can further include injecting spray plumes of a second charge of a liquid fuel larger than the first charge into cylinder 24 in the second engine cycle, again such that the spray plumes of the second charge advance through cylinder 24 from fuel injector 36 and enter combustion bowl 54. The concept diagram of FIG. 5 illustrates another spray plume 220 as might be injected in the second engine cycle, in particular a tail 224 of spray plume 220, as it might appear having been injected starting about 8 to 10° before top dead center, but requiring relatively longer to inject than the example in FIG. 4 due to the relatively larger amount of liquid fuel.

Spray plumes, including spray plume 220, of the second charge can be advanced through cylinder 24, such that unburned liquid fuel in tails of the spray plumes of the second charge, including tail 224, enter antebowl 84. The second charge of the liquid fuel that is injected may be combusted within combustion bowl 54 and also within antebowl 84. As can be seen in FIG. 5, tail 224 of spray plume 220 of the second charge may impinge upon combustion bowl edge 72, such that some of the unburned liquid fuel enter combustion bowl 54 and some makes its way around rounded inner rim surface 82 and up out of combustion bowl 54 into antebowl 84. It is believed that the additional volume provided in antebowl 84 can provide additional space for combustion such that the liquid fuel that would otherwise be unburned or only partially burned in a crevice volume between piston 38 and engine head 28 is instead more completely burned in antebowl 84 and thereby limits smoke production.

It will be recalled that engine 12 may be a relatively large bore engine. Relatively large bore engines have conventionally been produced with straight-sided, or non-re-entrant bowls. While such piston bowl configurations tend to work acceptably well at lower loads and at high loads as discussed herein, at mid-range loads, particularly in response to transients, or at startup, smoke management has proven more challenging. In urban environments, where powering server farms, and in other applications, the production of smoke in response to mid-range transients can be considered objectionable, thus, conventional piston bowl design and operating strategies can be inadequate. While all manner of chamfered piston bowls, contoured piston bowls, aftertreatment strategies, post-injection techniques, and still other smoke-mitgating approaches have been proposed over the years, there remains a need for advanced hardware development for engines, particularly relatively large bore engines, operating in the listed and other particular applications, with the needs not being met by presently known designs.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a compression ignition internal combustion engine comprising:
    moving a piston within a cylinder of the internal combustion engine toward a top dead center position, such that a pressure within the cylinder is increased to an autoignition threshold in a first engine cycle;
    injecting spray plumes of a first charge of a liquid fuel at a spray angle into the cylinder in the first engine cycle, such that the spray plumes of the first charge enter a combustion bowl formed by a piston end face in the piston and having a bowl diameter that is greater than 75% of a cylinder bore diameter of the cylinder;
    combusting the first charge of the liquid fuel at least predominantly within the combustion bowl;
    moving the piston within the cylinder toward the top dead center position such that a pressure within the cylinder is increased to an autoignition threshold in a second engine cycle;
    injecting spray plumes of a second charge of the liquid fuel larger than the first charge at the spray angle into the cylinder in the second engine cycle, such that the spray plumes of the second charge enter the combustion bowl;
    advancing the spray plumes of the second charge through the cylinder, such that unburned liquid fuel in tails of the spray plumes of the second charge enters an antebowl defined by a rounded inner rim surface of the piston, the rounded inner rim surface having a rounded profile from a planar outer rim surface to an edge of the combustion bowl, a radius of curvature from about 40% to about 55% of the bowl diameter and an antebowl volume that is about 0.8% or greater of a total volume of the combustion bowl and the antebowl together;
    combusting the second charge of the liquid fuel within the combustion bowl and within the antebowl;
    burning liquid fuel in the tails within the antebowl so as to limit conveying unburned liquid fuel to a crevice volume in the internal combustion engine;
    limiting smoke production by the internal combustion engine based upon the burning of the liquid fuel in the tails within the antebowl;
    the piston end face has a uniform profile of rotation circumferentially around a longitudinal center axis of the piston, and includes a center cone within the combustion bowl defining a cone angle, and the spray angle is larger than the cone angle; and the cylinder bore diameter is from about 160 millimeters to about 180 millimeters, and a total volume of the combustion bowl and the antebowl together is from about 200×10³ cubic millimeters to about 260×10³ cubic millimeters.

2. The method of claim 1 wherein the advancing of the spray plumes of the second charge further includes impinging the tails of the spray plumes of the second charge upon an edge of the combustion bowl having a radius of curvature from about 1 millimeter to about 2 millimeters.

3. The method of claim 1 further comprising increasing an amount of the fuel injected from the first engine cycle to the second engine cycle in response to a transient demand to operate the internal combustion engine at an increased engine load that is about 50% or less of an available engine load.

4. The method of claim 1 wherein the cylinder bore diameter is about 170 millimeters, the bowl diameter is about 130 millimeters, and the radius of curvature of the rounded inner rim surface is about 60 millimeters.

5. A direct-injected compression ignition internal combustion engine comprising:
an engine housing having a cylinder formed therein with a cylinder bore diameter;
a fuel injector including an injector tip positioned within the cylinder;
a piston movable within the cylinder from a bottom dead center position to a top dead center position to increase a pressure of fuel and air within the cylinder to an autoignition threshold;
the piston including a piston body defining a longitudinal center axis extending between a first axial piston body end and a second axial piston body end having a piston end face including a uniform profile of rotation circumferentially around the longitudinal center axis;
the piston end face forming a combustion bowl including a convex center section defining a cone angle and transitioning radially outward from the longitudinal axis and axially downward to a combustion bowl floor, and a concave outer section transitioning radially outward and axially upward from the combustion bowl floor toward a combustion bowl edge defining an edge plane;
the fuel injector is centered on the longitudinal center axis and includes spray orifices defining a spray angle larger than the cone angle;
the piston end face further including an annular piston rim having a planar outer rim surface that is oriented normal to the longitudinal axis and defines a rim plane, and a rounded inner rim surface that extends radially inward and axially downward from the planar outer rim surface to the combustion bowl edge and has a rounded profile from the planar outer rim surface to the combustion bowl edge;
an antebowl defined by the rounded inner rim surface and extending between the rim plane and the edge plane;
the combustion bowl having a bowl diameter that is greater than 75% of the cylinder bore diameter;
the rounded inner rim surface having a radius of curvature that is from about 40% to about 55% of the bowl diameter;
the antebowl having an antebowl volume that is about 0.8% or greater of a total volume of the combustion bowl and the antebowl together;

the cylinder bore diameter is from about 160 millimeters to about 180 millimeters, and a total volume of the combustion bowl and the antebowl together is from about 200×10³ cubic millimeters to about 260×10³ cubic millimeters.

6. The internal combustion engine of claim 5 wherein the antebowl volume is about 2000 cubic millimeters.

7. The internal combustion engine of claim 5 wherein the antebowl has an antebowl diameter that is about 120% of the bowl diameter or greater.

8. The internal combustion engine of claim 5 wherein the bowl diameter is about 77% of the cylinder bore diameter.

9. The internal combustion engine of claim 5 wherein the cylinder bore diameter is about 170 millimeters, the bowl diameter is about 130 millimeters, and the radius of curvature is about 60 millimeters.

10. The internal combustion engine of claim 9 wherein the antebowl diameter is about 160 millimeters.

11. The internal combustion engine of claim 5 wherein the concave outer section has a single radius of curvature and extends from the convex center section to a straight vertical section that adjoins the combustion bowl edge and is oriented parallel to the longitudinal piston axis.

12. The internal combustion engine of claim 11 wherein the straight vertical section has a length from about 1 millimeter to about 2 millimeters, and the combustion bowl edge has a radius of curvature from about 1 millimeter to about 2 millimeters.

13. A piston for a compression ignition internal combustion engine comprising:
a piston body defining a longitudinal center axis and including a piston crown, the piston crown having an outer piston surface extending circumferentially around the longitudinal center axis and having a plurality of piston ring grooves formed therein, and a piston end face having a uniform profile of rotation circumferentially around the longitudinal center axis and forming a combustion bowl;
the combustion bowl including a convex center section, centered on the longitudinal center axis, transitioning radially outward from the longitudinal piston axis and axially downward to a combustion bowl floor, and a concave outer section transitioning radially outward and axially upward from the combustion bowl floor toward a combustion bowl edge defining an edge plane, and the convex center section forming a cone and defining a cone angle of about 130°;
the combustion bowl further including a straight vertical section adjoining the combustion bowl edge, and oriented parallel to the longitudinal piston axis, such that the combustion bowl is non-reentrant;
the piston end face further including an annular piston rim having a planar outer rim surface that is oriented normal to the longitudinal axis and defines a rim plane, and a rounded inner rim surface that extends radially inward and axially downward from the planar outer rim surface to the combustion bowl edge and has a rounded profile from the planar inner rim surface to the combustion bowl edge;
an antebowl defined by the rounded inner rim surface and extending axially between the rim plane and the edge plane, and circumferentially around the longitudinal piston axis;
the combustion bowl having a bowl diameter from about 120 millimeters to about 135 millimeters;

the rounded inner rim surface having a radius of curvature that is from about 50 millimeters to about 70 millimeters;

the antebowl having an antebowl diameter that is about 120% of the bowl diameter, or greater, and an antebowl volume that is about 2000 cubic millimeters; and a total volume of the combustion bowl and the antebowl together is from about $200 \times 10^3$ cubic millimeters to about $260 \times 10^3$ cubic millimeters.

14. The piston of claim 13 wherein the concave outer section has a single radius of curvature and extends from the convex center section to a straight vertical section that adjoins the combustion bowl edge and is oriented parallel to the longitudinal piston axis.

15. The piston of claim 14 wherein the straight vertical section has a length from about 1 millimeter to about 2 millimeters, and the combustion bowl edge has a radius of curvature from about 1 millimeter to about 2 millimeters.

16. The piston of claim 13 wherein the bowl diameter is about 130 millimeters, the radius of curvature is about 60 millimeters, and the antebowl diameter is about 160 millimeters.

\* \* \* \* \*